United States Patent [19]

Elias

[11] 3,859,429

[45] Jan. 7, 1975

[54] M-IODOHIPPURIC ACID LABELLED WITH RADIOACTIVE IODINE AND PROCESS FOR ITS PREPARATION

[76] Inventor: Horst Hermann Elias, Farbwerke Hoechst A.G., Frankfurt/Main, Germany

[22] Filed: July 7, 1972

[21] Appl. No.: 269,730

[52] U.S. Cl. ............... 424/1, 23/230 B, 250/303, 252/301.1 R, 260/558 D
[51] Int. Cl. ............................................ A61k 27/04
[58] Field of Search .................. 424/1; 23/230 B; 260/558 D; 250/303; 252/301.1 R

[56] References Cited
OTHER PUBLICATIONS

Elekes et al., Nuclear Sci. Abs., Vol. 20, No. 23, Dec. 15, 1966, Item 43388.

*Primary Examiner*—Benjamin R. Padgett
*Attorney, Agent, or Firm*—Curtis, Morris & Safford

[57] ABSTRACT

Novel m-iodohippuric acid labelled with radioactive iodine and the salts thereof with physiologically compatible bases are described as well as their use in kidney function studies and for kidney scanning.

8 Claims, No Drawings

M-IODOHIPPURIC ACID LABELLED WITH RADIOACTIVE IODINE AND PROCESS FOR ITS PREPARATION

The present invention relates to m-iodohippuric acid labelled with radioactive iodine and to a process for its preparation.

The sodium salt of o-iodohippuric acid is known in urography as contrast medium. The preparation of $^{131}$I-labelled sodium-o-iodohippurate can be effected by isotopic exchange between Na$^{131}$I and inactive o-iodohippurate (cf., for example, M. Tubis, et alii, Proc. Soc. Exp. Biol. Med. 103 (1960), 497 – 498). The labelled compound was used in kidney function studies and for kidney scanning.

The poor stability of the sodium-o-iodohippurate in aqueous solution is disadvantageous. In this compound, the iodine is subject to an exchange against hydroxyl groups in aqueous solution, besides being subject to the exchange of isotopes. Due to autoradiolytical effects in the I-labelled compound, the decomposition reaction also depends on the radioactivity concentration of the solution. Attempts have, therefore, been made in practice to delay this reaction by employing as low activity concentrations as possible, by adding stabilizers or by storage at low temperatures.

However, for example, in one week old solutions of labelled sodium o-iodohippurate with activity concentrations of 0.5 mCi/ml, the free radio-iodine content is often not less than some per cent of the initially bound iodide activity. Upon application of these solutions for kidney function studies, the free iodine activity is mainly accumulated in the thyroid, thus causing an unwanted radiation exposure for this organ and disturbing the activity balance.

It is an object of this invention to provide a meta-iodohippuric acid labelled with radioactive iodine, which is substantially more stable than the corresponding o-iodohippuric acid and, therefore, seems to be especially well suited for kidney function studies.

It is another object of this invention to provide a process for the preparation of m-iodohippuric acid labelled with radioactive iodine which comprises bringing into contact inactive m-iodohippuric acid in the molten state with carrier-free sodium iodide in which the iodine is radioactive. In this method it is advantageous to maintain the temperature of the melt in the range of from 156° to 170°C, preferably in the range of from 160° to 162°C.

The radioiodine used for labelling the m-iodohippuric acid is carrier-free, i.e., it consists of pure iodine-131, iodine-125, iodine-123 or other radioisotopes of iodine without the addition of stable iodine-127. It is advantageous to employ the carrier-free radioiodine in the form of sodium iodide or another metal iodide. The amount of the carrier-free sodium iodide is negligibly small (for example, only about 8 . 10$^{-8}$ grams of iodine correspond to 10 millicuries of carrier-free iodine-131). The amount of radioactivity of carrier-free, radio-iodine containing sodium iodide to be applied for labelling the m-iodohippuric acid depends on the desired specific activity of the m-iodohippuric acid to be attained.

For the purpose of stabilization it is, furthermore, advantageous to add small amounts of sodium thiosulfate to the radioactive iodide.

In a preferred modification of the present invention, there is added to an alcoholic solution of m-iodohippuric acid an aqueous, carrier-free Na$^{131}$I—, Na$^{125}$I— or Na$^{123}$I solution, and this mixture is evaporated under reduced pressure to dryness in a rotating evaporator. The salt mixture so obtained is then maintained at a temperature of from 160° to 162°C for a period of from 10 to 60 minutes, preferably 20 to 40 minutes.

The melt, which has cooled off, is then dissolved in a small amount of dilute sodium hydroxide solution, to which is suitably added a small amount of inactive sodium iodide as a carrier.

For isolating the iodine-labelled m-iodohippuric acid, the alkaline solution is acidified with dilute hydrochloric acid, whereupon the m-iodohippuric acid precipitates. After washing the precipitate with water, the product is recrystallized, advantageously in a mixture of ethanol/water/isopropyl ether (4:4:1). In this manner colorless crystals are obtained which are not contaminated by bound radioactive iodine or by m-iodobenzoic acid. The labelling yields obtained are within the range of from 98 to 99.9%.

In the case of the m-iodohippuric acid, the exchange-labelling in the melt according to the invention permits a satisfactory exchange of the iodine against radioactive iodide which cannot be attained when employing the known processes in solution.

Stability studies in vitro of $^{131}$I-labelled m-iodohippuric acid with the concentration range of from 1 to 4 mg/ml and specific activity range of from 0.026 to 0.200 mCi/ml have shown, during a period of observation of 16 days, a liberation of less than 0.4% of iodine$^{131}$ (calculated on the total activity). Consequently, the m-iodohippuric acid labelled with radioactive iodine is substantially more stable than the respective o-iodohippuric acid.

Moreover, animal studies performed in Wistar-rats and Beagle-dogs have proved the suitability of m-I$^{131}$-hippuric acid for kidney function studies.

Preparation of m-iodohippuric acid m-Iodohippuric acid was prepared by reaction of m-iodobenzoyl chloride with glycine (Schotten-Baumann-reaction), m-iodobenzoic acid being the starting material for the benzoyl compound.

100 g (0.403 mole) m-iodobenzoic acid were refluxed with 600 ml of freshly distilled thionyl chloride for 2 hours. After distillation of excess thionyl chloride, vacuum fractionation gave 94.6 g (89.1%) m-iodobenzoyl chloride (b.p. 146°C at 12 mm Hg).

For the preparation of m-iodohippuric acid, 17.1 g (0.228 mole) glycine dissolved in 331 ml water were put into a three-neck-flask fitted with a stirrer and two dropping funnels filled with 60.1 g (0.228 mole) m-iodobenzoyl chloride and 18.23 g (0.456 mole) NaOH in 228 ml water, respectively. Under stirring, both m-iodobenzoyl chloride and the NaOH solution were added simultaneously within the time of an hour.

After the addition the reaction mixture was stirred for another hour before 35 ml of conc. HCl were added. The dark precipitate was filtered, washed with water and dried. For removal of m-iodobenzoic acid the raw product was suspended in 200 ml diethyl ether and refluxed for 5 minutes. Then the red ether phase was decanted and the procedure repeated. The residue was washed with ether and dissolved in a hot solvent mixture containing ethanol, water, and isopropyl ether (ratio 4:4:1) to which activated charcoal was added. After filtration, colorless crystals began to separate in the filtrate upon cooling. 31.8 g of m-iodohippuric acid were obtained which represents 45.6% of the theoretical yield.

After recrystallization from the above-mentioned solvent mixture, the melting point was 156.3°C (automatic determination with a Mettler m.p. apparatus).

| Analysis: | | | | | | | |
|---|---|---|---|---|---|---|---|
| found | C | 35.66 | H | 2.66 | N | 4.68 |
| calculated | C | 35.43 | H | 2.64 | N | 4.59 |

It was shown by NMR, mass spectroscopy and gas chromatography that the product was free of m-iodobenzoic acid.

$^{131}$I-Labelling of m-iodohippuric acid

Labelling was performed in pyrex glass ampoules (length 10–15 cm, inner diameter approx. 10 mm) fitted with a female ground-joint at the top. The $^{131}$I-activity was applied in form of a carrier-free aqueous Na$^{131}$I solution stabilized by small amounts of sodium thiosulfate. The necessary amount of the Na$^{131}$I-solution was transferred with a pipette into the ampoule which contained 50 to 500 mg of m-iodohippuric acid in alcoholic solution. This mixture was evaporated to dryness by connecting the ampoule to a vacuum rotary evaporator. Then the ampoules was heated for 30 minutes to 160° to 162°C whereby a homogeneous melt was formed. After cooling, the solid reaction mixture was dissolved in a few milliliters of 0.5N NaOH and approximately 1 mg of inactive NaI was added as a carrier.

For recovery of the exchange-labelled m-iodohippuric acid, the alkaline solution was mixed with 2 n HCl (up to pH = 1), for precipitation of the acid. The precipitate was centrifuged, digested in water, and again centrifuged. After decanting of the water, the slightly pink-colored product was recrystallized in a solvent mixture (ethanol:water:isopropyl ether = 4:4:1), filtered off with suction, washed with a little ice-cooled solvent mixture and dried. m-$^{131}$Iodohippuric acid was obtained in colorless crystals. Yield: 80% of the theory. For purity control of the labelled m-iodohippuric acid, two thin layer chromatograms were made and scanned:

a. To prove the absence of iodide activity, the substance was chromatographed on cellulose plates.
b. To prove the absence of $^{131}$I-labelled m-iodobenzoic acid, the substance was chromatographed on silica-gel plates, which give a reasonably good separation of m-iodohippuric acid ($R_f$ = 0.57), from m-iodobenzoic acid ($R_f$ = 0.72) and from iodide-ions ($R_f$ = 0.35).

In both cases the plates were developed with the same solvent mixture (n-butanol:glacial acetic acid : water = 6 : 1.5 : 2.5). Before being spotted on the plates the solutions to be chromatographed were mixed with a drop of a solution of ascorbic acid (5%) for reduction of iodine. Scanning of the plates was done immediately after drying to avoid air-oxidation of iodide. It was found that the product was free of iodide-activity and m-iodobenzoic acid.

The specific activity of the $^{131}$I-labelled m-iodohippuric acid was determined by counting a weighed amount of the acid in a standardized scintillation counter. Depending on the duration of melting, the results of labelling were within the range of from 98% to 99.9%.

The specific activity of the labelled m-iodohippuric acid was determined in each case by the amount of m-iodohippuric acid applied, by the amount of Na$^{131}$I activity applied and by the labelling yield.

Preparation of injection solutions

The calculated amount of m-$^{131}$iodohippuric acid was suspended in a little water, dissolved by the addition of a small amount of dilute sodium hydroxide solution, and the pH value of the solution was adjusted to 6–7 by drop-wise addition of dilute hydrochloric acid. Then the solution was diluted to a calculated volume by adding a sterile physiological sodium chloride solution which additionally contained 0.2% of 4-hydroxybenzoic acid ester.

Final values
specific activity of the solution: 0.1 mCi/ml
m-iodohippuric acid concentration: 1 mg/ml Radioactively labelled m-iodohippuric acid is generally used in the form of a salt with a physiologically compatible base, preferably as sodium salt.

What is claimed is:

1. m-Iodohippuric acid labelled with radioactive iodine and the salts of the labelled acid with physiologically compatible bases.

2. m-$^{123}$Iodohippuric acid and the salts thereof with physiologically compatible bases.

3. m-$^{125}$Iodohippuric acid and the salts thereof with physiologically compatible bases.

4. m-$^{131}$Iodohippuric acid and the salts thereof with physiologically compatible bases.

5. A process for the preparation of m-iodohippuric acid labelled with iodine, which comprises heating inactive m-iodohippuric acid in the molten state with sodium iodide or another metal iodide in which the iodine is radioactive to a temperature within the range of from 156° to 170°C, and then recovering the iodine-labelled acid.

6. The process as claimed in claim 5, wherein the radioactively labelled sodium iodide is sodium$^{123}$iodide, sodium-$^{125}$iodide or sodium$^{131}$iodide.

7. A process as claimed in claim 5 wherein the recovered iodine-labelled hippuric acid is salified by the addition thereto of a physiologically compatible base.

8. A pharmaceutical composition, adaptable to administration by injection for kidney function studies and for kidney scanning, said composition comprising m-iodohippuric acid labelled with radioactive iodine, or salts of the labelled acid with physiologically compatible bases, in combination with a physiologically tolerable liquid pharmaceutical diluent.

* * * * *